(12) United States Patent
Svetlik

(10) Patent No.: US 6,983,960 B2
(45) Date of Patent: Jan. 10, 2006

(54) MECHANICAL JOINT BELL ADAPTER FOR POLYETHYLENE PIPE

(75) Inventor: Harvey E. Svetlik, Grand Prairie, TX (US)

(73) Assignee: Independent Pipe Products, Inc., Dallas, TX (US)

( * ) Notice: Subject to any disclaimer, the term of this patent is extended or adjusted under 35 U.S.C. 154(b) by 124 days.

(21) Appl. No.: 10/743,395

(22) Filed: Dec. 22, 2003

(65) Prior Publication Data

US 2005/0134044 A1 Jun. 23, 2005

(51) Int. Cl.
*F16L 17/00* (2006.01)
(52) U.S. Cl. ...................................... 285/337; 285/374
(58) Field of Classification Search ................. 285/113, 285/108.3, 37, 339, 342, 343, 374
See application file for complete search history.

(56) References Cited

U.S. PATENT DOCUMENTS

| | | | | |
|---|---|---|---|---|
| 2,239,307 A | * | 4/1941 | Weber .......................... | 277/621 |
| 2,248,000 A | * | 7/1941 | Graham ........................ | 285/337 |
| 3,910,610 A | * | 10/1975 | Turner et al. ................. | 285/337 |
| 4,721,330 A | * | 1/1988 | Woodhouse .................. | 285/337 |
| 4,896,903 A | * | 1/1990 | Shumard ...................... | 285/337 |
| 5,060,989 A | * | 10/1991 | Gallucci et al. .............. | 285/337 |
| 5,071,175 A | | 12/1991 | Kennedy, Jr. | |
| 5,398,980 A | * | 3/1995 | Hunter et al. ................. | 285/337 |
| 5,509,699 A | | 4/1996 | Himmelberger | |
| 5,511,826 A | * | 4/1996 | Clare et al. ................... | 285/337 |
| 5,863,080 A | * | 1/1999 | Svetlik ......................... | 285/148.13 |
| 5,868,438 A | * | 2/1999 | Svetlik ......................... | 285/374 |
| 5,947,527 A | * | 9/1999 | Carter .......................... | 285/337 |
| 6,131,265 A | | 10/2000 | Bird | |

FOREIGN PATENT DOCUMENTS

GB 831294 * 3/1960

* cited by examiner

*Primary Examiner*—Aaron Dunwoody
(74) *Attorney, Agent, or Firm*—Charles D. Gunter, Jr.

(57) ABSTRACT

A pipe coupling is shown for coupling adjacent ends of a pair of pipe sections where one of the pipe sections is formed of a polyolefin and the other pipe section is formed of a different material. The coupling includes an adapter formed of a length of pipe having a polyolefin pipe wall, the adapter having a fusing end for fusing to a successive length of polyolefin pipe and a coupling end. The coupling end has an integral flange which defines a bell end opening for the adapter. The bell end opening has a first region of reduced internal diameter for receiving a sealing gasket. The bell end opening also has a second region of further reduced internal diameter which forms a circumferential shoulder region therein for receiving a male spigot end of a mating pipe which is formed of the different material. A rigid reinforcing ring circumscribes an outer peripheral surface of the adapter flange in order to strengthen the connection when the spigot end of a mating male pipe is inserted within the bell end opening of the adapter to form the pipe coupling.

5 Claims, 2 Drawing Sheets

MECHANICAL JOINT BELL ADAPTER FOR POLYETHYLENE PIPE

BACKGROUND OF THE INVENTION

1. Field of the Invention

The present invention generally relates to the field of pipe connections and to devices used in the pipeline construction industry. More particularly, this invention relates to devices used to join the ends of a polyolefin pipe, such as a polyethylene pipe, to a pipe of a different material such as PVC or ductile iron.

2. Description of the Prior Art

Typical water pipe systems use rigid pipes such as ductile iron, cast iron, or concrete which mate with fittings such as mechanical joints. While such pipes are advantageously strong, many are very heavy and cumbersome to work with, and in the case of iron suffer from corrosion. In recent years, it has been the practice of many contractors to employ polyolefins such as polyethylene, particularly high density polyethylene (HDPE), and plastics such as polyvinyl chloride (PVC) in plastic pipe used in new construction. However, many of the underground sewer and water distribution pipes, fittings and valves still contain cast iron and ductile iron. Since these dissimilar materials cannot be joined by conventional means, such as brazing, soldering or gluing, so called "mechanical joint" connections and gland restraining devices have been adapted to provide a fluid-tight connection.

Some current gland restrainer systems designed for PVC piping employ mechanical restrainer connections intermittently disposed around the PVC pipe in a gripping fashion. The gland segments of these devices are then bolted together to complete the connection. As a typical example, one system which exists in the market place today for PVC plastic pipe connections is the "CERTA-LOK"™ system sold by CertainTeed Corporation, of Valley Forge, Pa. This system provides a restrained joint between PVC pipe for municipal, fire protection, and other uses. This system offers certain advantages, since the restraining mechanism is uniformly distributed around the PVC pipe. As a result, the risk of damaging the plastic side walls by localized stress fracture is minimized. However, there has been no similar technique for joining sections of pipe of dissimilar materials together where the pipe in question are polyolefins such as polyethylene, HDPE.

In some situations, HDPE offers advantages over the use of PVC as a pipe material. For example, the PVC pipe may crack when flexed. The flexible polyolefin-type plastic pipes, including HDPE, are lightweight, easy to work with, corrosion resistant and can be fused together at the joint to form a continuous pipe to thereby minimize leakage. Polyolefin pipe, however, also suffers from certain drawbacks that have impeded its widespread use in water pipe systems and similar fluid transport systems.

As in the case of PVC pipe, the task of mechanically mating the end of a polyolefin pipe, such as HDPE, to some of the other members in a water system, and particularly to metal mechanical joints, presents significant problems. This is due, in part, to the cold flow properties of the polyolefin-type plastic. In some cases, the ends of such pipes tend to deform under pressure leading to an inadequate seal at the mechanical connection. Moreover, the pipe ends may work loose from the mechanical joint due, for example, to the greater expansion/contraction rate of that type of plastic as compared to other more rigid pipes. In such a case, the connection pulls apart.

One attempted solution to the above noted problems has been to stiffen the pipe end so that it will neither deform under pressure nor work lose from the joint. One approach to solving this problem involves force fitting a rigid tube such as a steel tube inside the polyolefin pipe at the pipe end in sealing engagement with the inner diameter of the plastic pipe wall. The rigid tube act as a stiffener at the pipe end. And while the stiffening tube is believed to provide better resistance to pipe end deformation, the polyolefin pipe end may still come loose in use. Other attempted solutions to the problems of joining polyolefin pipe to pipes of different materials have involved complicated mechanical arrangements with a number of parts which were often difficult and cumbersome to install.

A need exists therefore, for an improved system for mechanically coupling polyolefin water pipes to pipes of different material such as cast iron or ductile iron pipes.

A need also exists for a female or bell mechanical joint adapter for permitting the assembly of fluid-type fittings containing multiple materials, such as HDPE, PVC and cast and ductile iron.

There also remains a need for providing an inexpensive mechanical bell joint adapter for joining HDPE to ductile or cast iron or PVC which can be field-assembled with little chance of error and with a minimum amount of assembly time.

SUMMARY OF THE INVENTION

The pipe coupling of the invention is used for coupling adjacent ends of a pair of pipe sections where one of the pipe sections is formed of a polyolefin and the other pipe section is formed of a different material. The coupling includes an adapter formed of a length of pipe having a polyolefin pipe wall, the adapter having a fusing end for fusing to a successive length of polyolefin pipe and a coupling end. The coupling end of the adapter has a nominal thickness pipe wall with an integral flange formed at one end thereof. The integral flange defines a bell end opening for the adapter. The bell end opening has a first region of reduced internal diameter for receiving a sealing gasket therein. The bell end opening also has a second region of further reduced internal diameter which forms a circumferential shoulder region therein for receiving a male spigot end of a mating pipe which is formed of the different material.

The adapter integral flange has a front face, a rear face and an outer peripheral surface. A rigid reinforcing ring circumscribes the outer peripheral surface in order to strengthen the connection when the spigot end of a mating male pipe is inserted within the bell end opening of the adapter to form the pipe coupling. Preferably, the length of pipe having the polyolefin wall is formed of polyethylene. The length of pipe of a different material may be formed of such materials as PVC, ductile iron, cast iron and steel.

The adapter as described above can be used to form a pipe joint between pipes of dissimilar materials. This allows a first section of pipe having a polyolefin pipe wall and a second section of pipe of a different material to be joined together. A sealing gasket is installed within the first region of reduced internal diameter of the integral flange. A male spigot pipe end of the second section of pipe is then inserted within the bell end opening and engages the circumferential shoulder region of the belled end opening to thereby form a sealed pipe joint. If desired, a mechanical restraint system can be used to engage an external surface of the second section of pipe and the front face and rear face of the integral flange, respectively, in order to prevent the second section of pipe from pulling away from the bell end opening of the integral flange.

Additional objects, features and advantages will be apparent in the written description which follows.

DETAILED DESCRIPTION OF THE INVENTION

Figure 1:
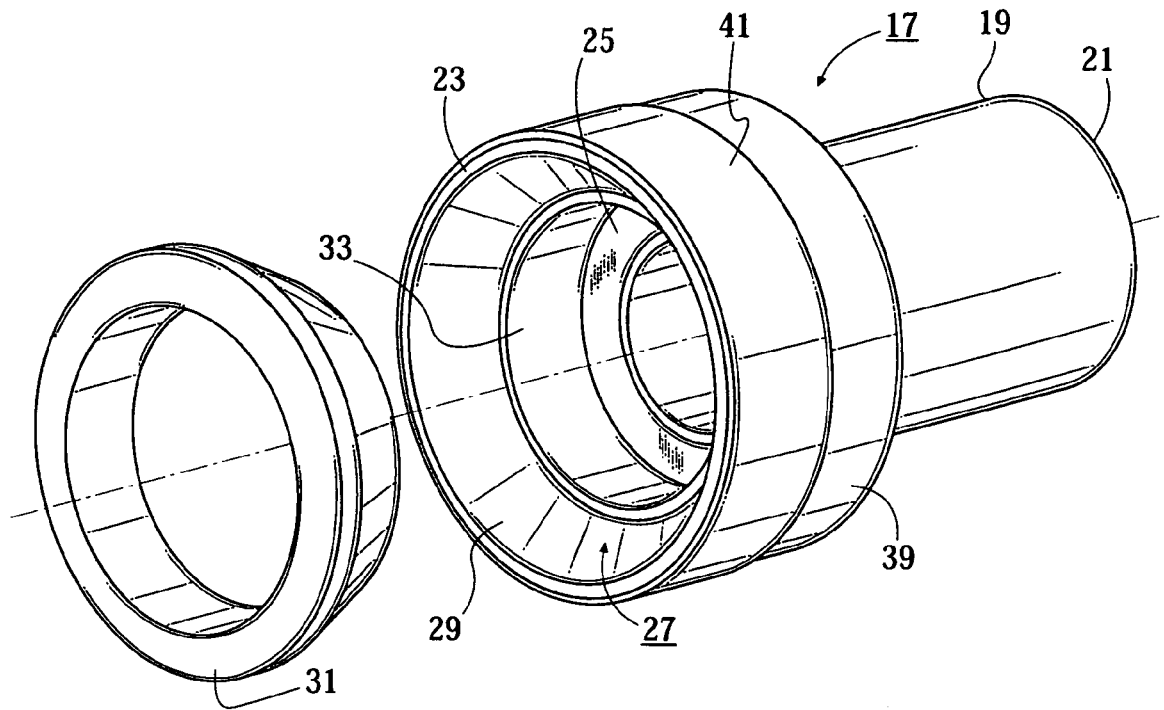
FIG. 1 is an exploded view of the adapter of the invention.

It is well known in the art to extrude plastic pipes in an elongated cylindrical configuration of a desired diameter and to then cut the extruded product into individual lengths of convenient size suitable for handling, shipping and installing. By "plastic" is meant a section of pipe formed from a convenient polyolefin or polyolefin derivitive such as polypropylene, polyethylene or polyvinylchloride (PVC). Each length of pipe is enlarged or "belled" at one end sufficiently to join the next adjacent pipe section by receiving in the belled end the unenlarged or "spigot" end of the next adjacent length of pipe within the bell end opening. The inside diameter of the bell is formed sufficiently large to receive the spigot end of the next section of pipe with sufficient clearance to allow the application of an elastomeric gasket or other sealing device designed to prevent leakage at pipe joints when a plurality of pipe lengths are joined to form a pipeline.

Plastic pipes of the above type have, for many years, been joined by utilizing an elastomeric gasket which is compressed between the inside walls of the bell and the outside wall of the plain or beveled end of the spigot end of the next pipe in a series of telescoped pipes. The gasket is typically retained within a groove provided in the bell end opening of the female pipe section. One problem which exists, however, is finding a way to "restrain" the assembled pipe joint so that the joint will not separate due to internal or external pressure, or due to environmental factors such as earth movement.

As mentioned in the background discussion of the invention, the iron pipe industry has addressed the problem of providing a restrained pipe joint by utilizing a sealing "gland" and fitting, sometimes referred to as a "mechanical joint" or simply as an "MJ". The bell end of an iron pipe section has a flanged portion cast on it. The spigot end of a second iron pipe is fitted with a slidable gland fitting and a gasket that is conically shaped. The conically shaped gasket is positioned between the gland fitting and the spigot end of the pipe. The gland fitting has a plurality of apertures for receiving standard bolts. The joint is formed when the spigot is axially inserted into the bell, and the gland fitting and the flanged portion are bolted together, causing the lip of the gland fitting to compress the gasket thus sealing the two sections of pipe.

Because of the different materials of plastic pipe systems and cast iron pipe systems, the sealing components utilized must be designed differently. The restraining mechanism employed will differ in the plastic pipe system, primarily due to the fact that the plastic pipe can be "scored" or crushed by the restraining mechanism if improper stresses are exerted during the joint assembly or during use. This is not generally a problem in the case of cast iron pipe, because of the difference in material making up the pipe itself.

In the discussion which follows, the terms "plastic", "polyolefin", "vinyl compound" and "polyvinyl chloride" (PVC) will have particular meanings which are taken from common usage in the relevant pipe joining industry. The term "polyolefin" is intended to encompass that family of materials such as polyethylene, $H_2C=CH_2$ which is produced commercially by cracking petroleum fractions. Although the present invention may deal with any of the low density (0.910 to 0.925 g per cc), high density (0.942 to 0.965 g per cc) and medium density (MDPE) polyethylenes, the preferred material is high density polyethylene, HDPE. The term "vinyl compound" is intended to encompass that family of the vinyl compounds having the general formula $H_2C=CH_x$, where X may be hydrogen, an alkyl group, an aryl group, or a negative atom or group, such a halogen, hydroxy, or acetate. However, the preferred material for purposes of the present invention is polyvinyl chloride, PVC.

In the present discussion, while both HDPE and PVC might be considered "plastics", PVC will be referred to as being a "plastic" while the terms HDPE and MDPE will be used to describe particularly preferred "polyolefins." When the specification refers to a material as being a "different material" from HDPE, the different material will be a material such as PVC, ductile iron, cast iron, steel, etc.

Figure 2:
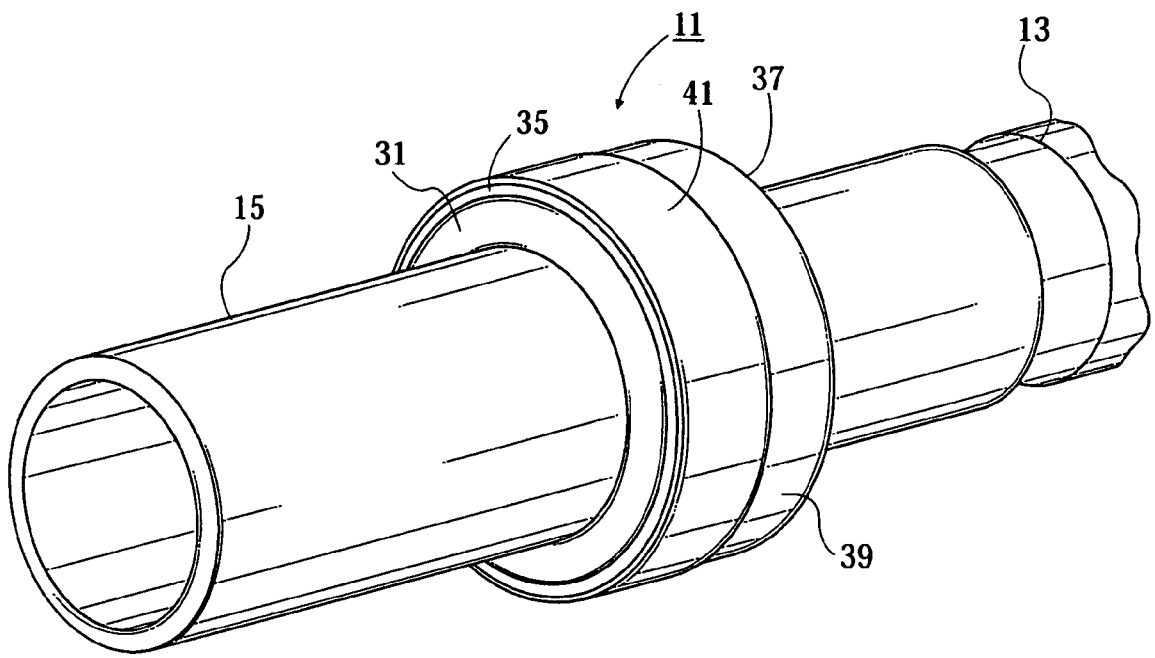
FIG. 2 is a perspective view of a pipe joint made using the adapter of the invention.

Turning first to FIG. 2, there is shown a pipe coupling 11 which couples adjacent ends 13, 15 of a pair of pipe sections where one of the pipe sections is formed of a polyolefin and the other pipe section is formed of a different material. In the example shown in FIGS. 1 and 2, the pipe end 13 is formed of polyethylene, preferably HDPE, and the opposite pipe end 15 is formed of ductile iron or PVC. As shown in FIG. 1, an adapter 17 is used to form the pipe coupling 11. The adapter 117 allows the section of polyolefin pipe 13 to be joined to the section of ductile iron pipe or PVC pipe 15 to form the pipe coupling.

The adapter 17 is formed of a length of pipe having a polyolefin pipe wall 19 which, in this case, is HDPE. The adapter 17 has a fusing or joining end 21 for joining the adapter to a successive length of polyolefin pipe 13, as by butt fusing using known commercially available technology. The adapter 17 also has a coupling end 23. The coupling end 23 has a nominal pipe wall (as at 25 in FIG. 1) with an integral flange formed at one end thereof.

The integral flange of the adapter 17 defines a bell end opening 27 for the adapter. The bell end opening 27 forms a first region of reduced internal diameter 29 for receiving a sealing gasket 31. The sealing gasket 31 is formed of rubber or a rubber like material and is commercially available from a number of sources as a "standard MJ gasket." For example, such a gasket is commercially available from Independent Pipe Products of Grand Prairie, Tex. The gasket 31 has a generally conical profile, as view in FIG. 1.

The integral flange of the adapter 17 also has a second region of reduced internal diameter 33 which forms a circumferential shoulder region (generally at 25) for receiving a male spigot end of the pipe section 15 when the mating male pipe section is inserted within the bell end opening 27. The pipe section 15, as previously noted, is made of a "different material" such as ductile iron or PVC.

Figure 3:
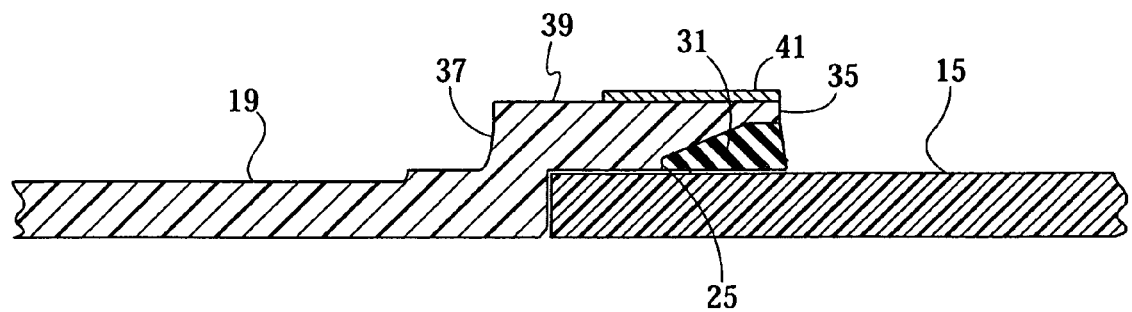
FIG. 3 is a side, cross sectional view of the bell end opening of the adapter of the invention showing the male spigot pipe end being inserted into the end opening.
Figure 4:
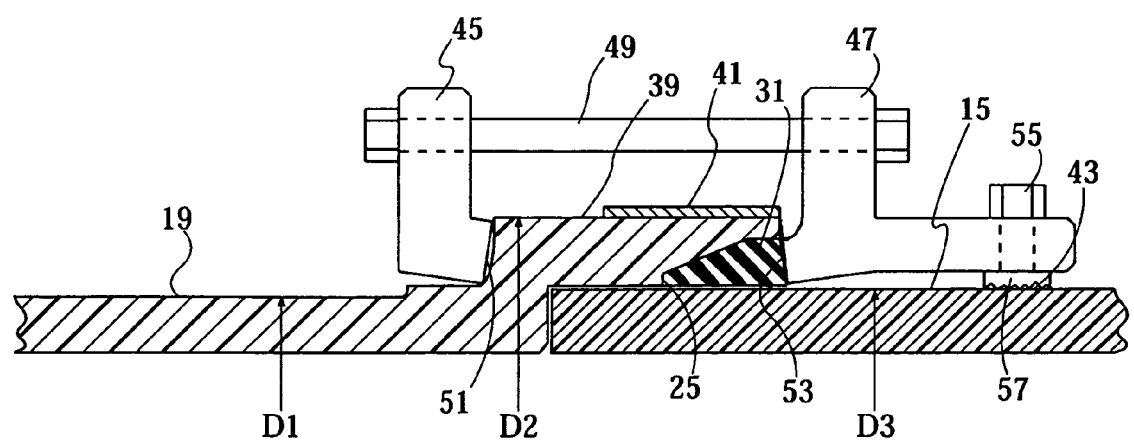
FIG. 4 is a view similar to FIG. 3 but also showing a mechanical restraint system used with the adapter of the invention to make up a pipe joint of dissimilar pipe materials.

The integral flange of the adapter 17 also has a front face 35, a rear face 37 and an outer peripheral surface 39. As shown in FIGS. 3 and 4, a rigid reinforcing ring 41 circumscribes the outer peripheral surface 39 in order to strengthen the connection when the spigot end of the mating male pipe is inserted within the bell end opening of the adapter to form a pipe coupling. The rigid reinforcing ring can be formed of a variety of metals or even hard plastics. However, the ring 41 is preferably formed of stainless steel.

The adapter with its integral flange can be injection molded or machined, as from a solid or hollow block of the polyolefin. FIG. 4 and the table which follow give typical dimensions (D1, D2 and D3) for industry standard pipe sizes in the 2" to 12" range. The thickness of the integral flange is also limited by the internal diameter of a ring of cross bolts used in the mechanical restraint system, as will be further described.

TABLE I

| Nominal Size IPS & DIPS | D1 IPS | D1 DIPS | D2 | D3 | OAL |
|---|---|---|---|---|---|
| 2" | 2.38 | 2.50 | 4.00 | 2.51 | 8.00 |
| 3" | 3.50 | 3.96 | 5.37 | 3.97 | 8.00 |
| 4" | 4.50 | 4.80 | 6.63 | 4.81 | 8.00 |
| 6" | 6.63 | 6.90 | 8.63 | 6.92 | 10.00 |
| 8" | 8.63 | 9.05 | 10.75 | 9.08 | 11.00 |
| 10" | 10.75 | 11.10 | 12.75 | 11.13 | 11.00 |
| 12" | 12.75 | 13.20 | 15.30 | 13.24 | 13.00 |

As shown in FIGS. 3 and 4, the pipe joint of the invention can further include a mechanical restraint system which engages an external surface (as at 43 in FIG. 4) of the second section of pipe of the different material and the front and rear faces 35, 37 of the integral flange, respectively, in order to prevent the second section of pipe from pulling away from the bell end opening of the integral flange. In the embodiment of the invention illustrated in FIGS. 3 and 4, the mechanical restraint system includes a gland ring 45 and a cooperating restraining gland 47 which are connected by a series of cross bolts 49. Tightening the cross bolts 49 causes force to be exerted on the respective contact faces 51, 53 of the mechanical restraint in order to compress the sealing gasket 31 and prevent separation of the joint. The restraining gland 47 has a series of circumferential holes which receive the restraining screws 55. Screws 55 have lower ends 57 which, in this case, bite into the external surface of a PVC pipe.

An invention has been provided with several advantages. The mechanical joint bell adapter and pipe joint using the adapter significantly simplify the assembly of a section of polyolefin pipe to a section of pipe of a dissimilar material. The integral flange, which is formed of the same material as the remainder of the adapter body, eliminates additional gaskets and gland rings which were required in the past. The rigid reinforcing ring which circumscribes the integral flanges supports the additional radial load needed to keep the polyolefin from bulging and to prevent the gasket from being extruded from the coupling. The reinforcing ring allows the coupling to develop the full gasket load for the connection.

While the invention has been shown in only one of its forms, it is not thus limited but is susceptible to various changes and modifications without departing from the spirit thereof.

What is claimed is:

1. A pipe coupling for coupling adjacent ends of a pair of pipe sections where one of the pipe sections is formed of a polyolefin and the other pipe section is formed of a different material, the coupling comprising:
   an adapter formed of a length of pipe having a polyolefin pipe wall, the adapter having a fusing end for fusing to a successive length of polyolefin pipe and a coupling end;
   wherein the coupling end of the adapter has a nominal thickness pipe wall with an integral flange formed at one end thereof,
   wherein the integral flange defines a bell end opening for the adapter, the bell end opening having a first region of reduced internal diameter receiving a sealing gasket therein, the sealing gasket being conically profiled when viewed in cross section having an inner extent and an outer extent, the bell end opening also having a second region of further reduced internal diameter which forms a circumferential shoulder region therein receiving a male spigot end of a mating pipe which is formed of the different material;
   the adapter integral flange having a front face, a rear face and an outer peripheral surface, and wherein a rigid metal reinforcing ring is closely received upon and circumscribes the outer peripheral surface forming an outer sleeve thereon in order to strengthen the connection and prevent extrusion of the sealing gasket when the spigot end of a mating male pipe is inserted within the bell end opening of the adapter to form the pipe coupling, the first region of reduced internal diameter forming a sloping conical surface receiving the conically profiled sealing gasket, the outer extent of the sealing gasket being located approximately flush with the front face of the integral flange of the adapter; and
   a mechanical restraint system which engages an external surface of the mating male pipe and the front and rear faces of the integral flange, respectively, in order to prevent the mating male pipe from pulling away from the bell end opening of the integral flange, the mechanical restraint system including a gland ring and a cooperating restraining gland which are connected by a series of cross bolts, whereby tightening the cross bolts causes force to be exerted on the mechanical restraint in order to compress the sealing gasket and prevent separation of the coupling, the restraining gland being provided with a series of circumferential holes which receive restraining screws, the screws having lower ends which bite into the external surface of the mating male pipe.

2. The pipe coupling of claim 1, wherein the length of pipe having the polyolefin wall is formed of polyethylene.

3. A pipe joint, comprising:
   a first section of pipe having a polyolefin pipe wall and a second section of pipe of a different material;
   an adapter formed of a length of pipe having a polyolefin pipe wall, the adapter having a fusing end which is fused to the first section of pipe, the adapter also having a coupling end;
   wherein the coupling end of the adapter is joined to the fusing end by a nominal thickness pipe wall with an integral flange being formed on the coupling end thereof,
   wherein the integral flange defines a bell end opening for the adapter, the bell end opening having a first region of reduced internal diameter for receiving a sealing gasket therein, the sealing gasket being conically profiled when viewed in cross section having an inner extent and an outer extent, the bell end opening also having a second region of further reduced internal diameter which forms a circumferential shoulder region therein for receiving a male spigot end of a mating pipe which is formed of the different material;

the adapter integral flange having a front face, a rear face and an outer peripheral surface, and wherein a rigid metal reinforcing ring is closely received upon and circumscribes the outer peripheral surface forming an outer sleeve thereon in order to strengthen the connection and prevent extrusion of the sealing gasket when the spigot end of a mating male pipe is inserted within the bell end opening of the adapter to form the pipe coupling, the first region of reduced internal diameter forming a sloping conical surface receiving the conically profiled sealing gasket, the outer extent of the sealing gasket being located approximately flush with the front face of the integral flange of the adapter;

the sealing gasket installed within the second region of reduced internal diameter of the integral flange;

a male spigot pipe end of the second section of pipe being inserted within the bell end opening and engaging the circumferential shoulder region thereof to thereby form a sealed pipe joint; and a mechanical restraint system which engages an external surface of the second section of pipe of the different material and the front and rear faces of the integral flange, respectively, in order to prevent the second section of pipe from pulling away from the bell end opening of the integral flange, the mechanical restraint system including a gland ring and a cooperating restraining gland which are connected by a series of cross bolts, whereby tightening the cross bolts causes force to be exerted on the mechanical restraint in order to compress the sealing gasket and prevent separation of the coupling, the restraining gland being provided with a series of circumferential holes which receive restraining screws, the screws having lower ends which bite into the external surface of the second section of pipe.

4. The pipe joint of claim 3, wherein the length of pipe having the polyolefin wall is formed of polyethylene.

5. The pipe joint of claim 3, wherein the length of pipe of a different material is formed of a material selected from the group consisting of PVC, ductile iron, cast iron and steel.

* * * * *